W. H. HESS.
FORAGE AND GRAIN GRINDER.
APPLICATION FILED OCT. 27, 1908.

963,224.

Patented July 5, 1910.

Witnesses:

Inventor:

William H. Hess

UNITED STATES PATENT OFFICE.

WILLIAM H. HESS, OF WICHITA, KANSAS.

FORAGE AND GRAIN GRINDER.

963,224. Specification of Letters Patent. Patented July 5, 1910.

Application filed October 27, 1908. Serial No. 459,720.

*To all whom it may concern:*

Be it known that I, WILLIAM H. HESS, a resident of Wichita, in the county of Sedgwick and State of Kansas, have invented certain new and useful Improvements in Forage and Grain Grinders; and I do hereby declare the following to be a full, clear, and exact description of the invention, such as will enable others skilled in the art to which it appertains to make and use the same.

Figure 1:
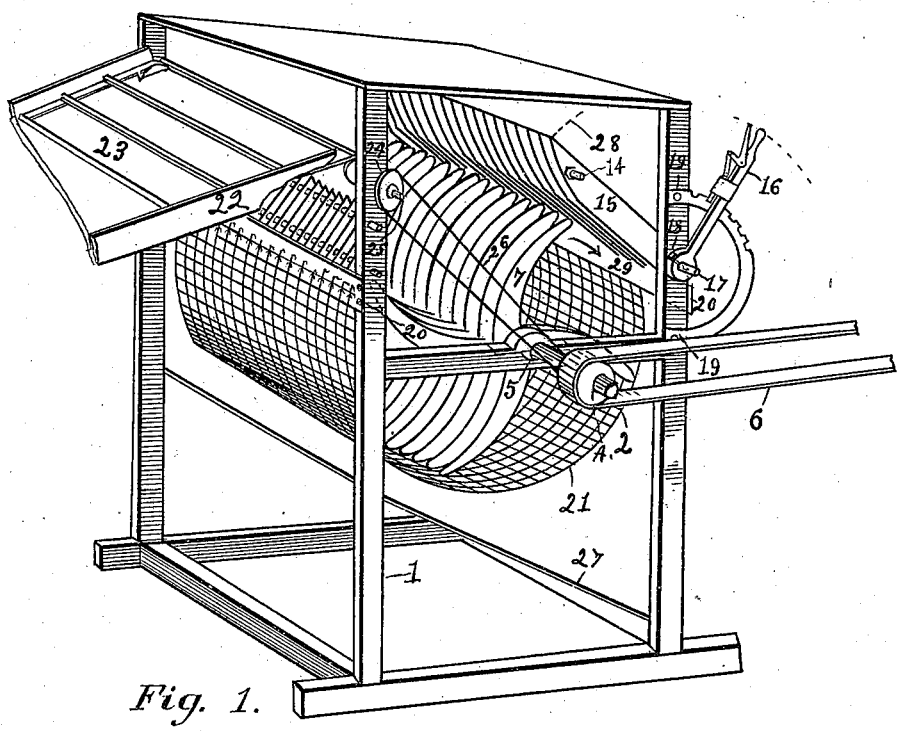
Figure 2:
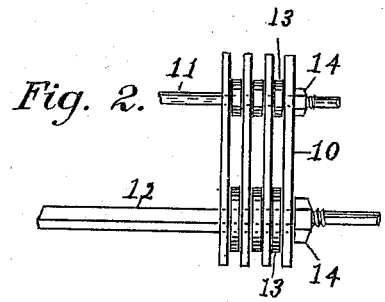
Figure 3:
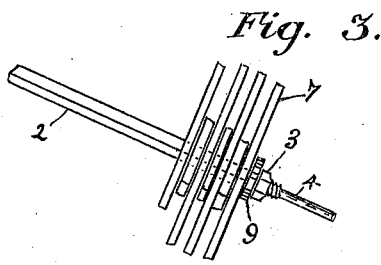
Figure 4:
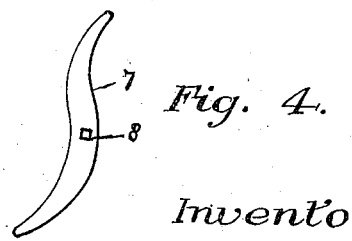

My invention relates to improvements in forage and grain grinder in which a series of blades are mounted upon a shaft, and are rotated in operative relation to blades affixed near the path of rotation of the aforesaid blades, and the objects of my invention are first, to provide grinding means without sharp cutting edges, second, to provide for centralizing any foreign object which might enter the machine and keep it out of contact with the stationary blades, third to provide means for grinding both forage and grain. I attain these objects by the mechanism illustrated in the accompanying drawing in which, Figure 1, is a perspective view of my machine. Fig. 2, series of blades mounted on a pair of shafts. Fig. 3, a series of blades alternately mounted on a square shaft. Fig. 4, the configuration of a blade having a square hole therein.

Referring to the drawings 1, designates a frame having the weather boarding removed to show the internal arrangement of machinery with said frame, in which is mounted a square shaft 2, said shaft has a portion of each end rounded and threaded to receive jam-nuts 3, from the threaded portions are reduced extensions 4, which makes a journal bearing 5, on the other end of said shaft is a pulley A, which is driven by a belt 6. On said shaft 2, is mounted a plurality of approximately S shaped blades, said blades have square holes 8, which fit the shaft 2, as will be seen in Fig. 1. These blades 7, are mounted alternately crosswise on the shaft 2, (see Fig. 3) against the outer blades are washers 9. The blades are made tight on the shaft by screwing up the jam-nuts 3.

A series of straight blades 10, are mounted on a pair of shafts 11, and 12, the shaft 12, is square and is exactly like shaft 2, shaft 11, differs from shaft 12, the body portion being round. Washers 13, are placed between the blades to space them equi-distant and the blades are tightened with the jam-nuts 14. A series of blades having one end rounded off as shown in Fig. 1, is mounted on a pair of shafts exactly like 11, and 12, and is spaced apart by washers and tightened by jam-nuts now shown.

A ratchet lever 16, is placed on the end of the shaft 17, and secured thereto by a set-screw 18, the said lever engages with a semi-circle toothed-bar the free ends of which are fastened to the frame 1, by screws 19.

Wooden bars 20, are nailed transversely to the frame 1, and the free ends of a semi-circle screen 21, is fastened to said bars with staples 22, the elevator 23, is driven by a shaft and pulley 24, and 25, being rotated by a belt 26. An incline floor 27, is made beneath the screen 21, which conducts the ground material out from under the screen where it can be readily disposed of.

Having described the construction of my machine I will now proceed to describe the assembling thereof.

Shaft 2, is mounted in the frame 1, as shown, and the screen 21, is positioned beneath as seen. In two of the posts of the frame 1, are holes in which the ends of the shafts 11, and 12, are inserted which places the blades 10, near the path of the rotation of the blades 7. On the opposite side of the frame in the two corner posts are holes to receive the ends of the shaft 17. It will be seen the free ends of the blades 15, can be adjusted as indicated by the dotted lines 28, when the lever 16, is shifted. The object in moving these blades close to the path of rotation of the end of the blades 7, is to grind the material finer, and to increase or decrease the capacity of the machine. It is to be noted all the blades are without sharp edges and never need be ground. It will be further noted that one of the crowning features of my machine is if a piece of iron should enter the machine the blades 7, being curved and rotating in the direction of the arrow 29, the iron would be centralized to the shaft 2, and held there out of contact with the blades 10, and 15, and the screen 21. It is to be further noted that when the material enters the machine there is no escape except through the screen 21.

Having described my invention, what I claim is:

1. In a forage and grain grinder, the combination of a frame having mounted therein a shaft, a series of curved blades mounted on said shaft, shafts rigidly affixed parallel in the aforesaid frame, blades mounted on said shafts, other blades mounted on parallel shafts, one of said shafts rotatably mounted in said frame, and a lever to rock said shaft means to lock said lever and a screen beneath the first named blades, as described and set forth.

2. In a forage and grain grinder, a frame having rotatably mounted therein a shaft, said shaft bearing a series of curved blades, one series approximately perpendicular to the other series, a series of blades mounted on parallel shafts, said shafts rigidly affixed in said frame near the path of rotation of the first named blades, a series of blades rigidly mouned on parallel shafts near the path of rotation of the first named blades, one of said shafts being journaled in the aforesaid frame, means for rocking and locking said shaft, whereby the free ends of the said blades may be adjusted with respect to the path of rotation of the first named blades, means for retaining the forage within the field of the rotation of the rotative blades, as described and set forth.

3. In a forage and grain grinder, a frame having rotatably mounted therein a shaft, said shaft bearing a series of curved blades, one series approximately perpendicular to the other series, a series of blades mounted on parallel shafts, said shafts rigidly affixed in said frame near the path of rotation of the first named blades, a series of blades having their free ends upwardly curved, rigidly mounted on parallel shafts, near the path of rotation of the first named blades, one of said shafts being journaled in the aforesaid frame, means for rocking and locking said shaft whereby the free ends of the said blades may be adjusted with respect to the path of rotation of the first named blades, means for retaining the forage within the field of the rotation of the rotative blades, consisting of a semicircular sieve affixed in the frame beneath said rotative blades, as described and set forth.

In testimony whereof, I have signed this specification in the presence of two subscribing witnesses.

WILLIAM H. HESS.

Witnesses:
ELMER JOHNSON,
W. STEWART BROWN.